(No Model.)

C. W. JARRELL.
GAS WASHER.

No. 413,514. Patented Oct. 22, 1889.

Witnesses
Wm T. Robertson
E. Everett Ellis

Charles W. Jarrell
Inventor
By
Wm. C. r. W. Entire Attorney

UNITED STATES PATENT OFFICE.

CHARLES WADDY JARRELL, OF SHELBY, ALABAMA.

GAS-WASHER.

SPECIFICATION forming part of Letters Patent No. 413,514, dated October 22, 1889.

Application filed July 19, 1889. Serial No. 318,040. (No model.)

*To all whom it may concern:*

Be it known that I, CHARLES WADDY JAR-RELL, a citizen of the United States, residing at Shelby, in the county of Shelby and State of Alabama, have invented certain new and useful Improvements in Gas-Washers; and I do hereby declare the following to be a full, clear, and exact description of the invention, such as will enable others skilled in the art to which it appertains to make and use the same.

This invention relates to certain new and useful improvements in purifying apparatus for gas; and it consists, substantially, in such features of arrangement, construction, and combinations of parts as will hereinafter be more particularly described and claimed.

The invention has for its object to provide an apparatus for the purification of furnace-gases, in which the gas is made to pass upward through a flue or tank, while a spray of water descends to the bottom of the tank through the gas.

Further, the invention has for its object to provide an apparatus for the purification of gases, in which two sets of inclined water-shelves are so arranged relatively to each other that the gas is caused to take a zigzag course in its passage upward, and the spray of water descending from above is broken in its fall, so that the gas is more thoroughly broken up, and by the attrition the globules or vescicles are broken and the foreign matters are released and caused to descend to the bottom of the apparatus.

Finally, the invention has such other objects in view as will more fully hereinafter appear when taken in connection with the accompanying drawings, wherein—

Figure 1:
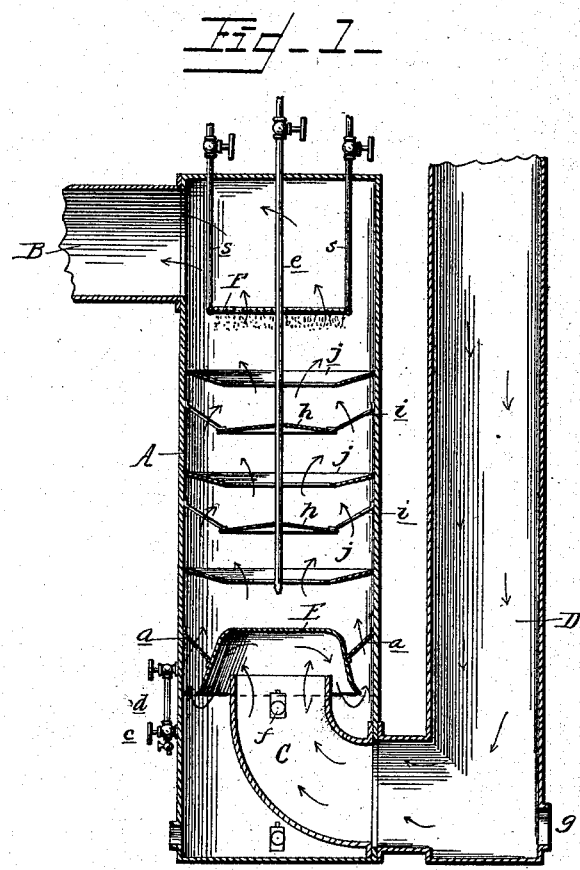
Figure 2:
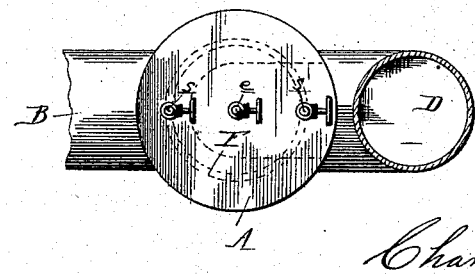

Figure 1 represents a vertical elevation of a gas-purifying apparatus constructed and arranged in accordance with my invention, and Fig. 2 is a top or plan view thereof.

In carrying my invention into effect I provide a suitable upright apparatus having at its top an outlet for the escape of the purified gas, and having in its side at or near the bottom an opening for receiving the upwardly-curved pipe leading from and communicating with the flue or "down-comer" from the furnace. Supported above the upper end of the curved pipe is a deflector, which causes the incoming gas to pass downwardly and thence up through the water contained in the reservoir at the bottom of the apparatus. Around the interior walls or sides of the apparatus, and above the deflector, are a series of inclined water-shelves, reaching a short distance within the apparatus, and intermediate of these shelves are arranged circular inclined water-shelves, which are supported centrally of the apparatus, and the edges or peripheries of which extend far enough to come slightly under the side shelves. I employ a central pipe for discharging a stream of water upon the deflector to keep it cool, and a circular perforated pipe arranged at the top of the apparatus for discharging a spray throughout the whole interior thereof. The result of the construction described is that the water issuing from the upper circular spray-pipe will first fall upon the upper one of the inclined side shelves, then flow or bound off onto the circular shelf beneath, and thence onto the next side shelf, and so on, thus being completely broken up in its fall several times before it reaches the bottom. As the water is falling, and being thus broken up in its fall, the gas is passing upwardly and in and out from beneath the two sets of shelves, and the effect is to thoroughly purify the gas and render it fit for use for many purposes in the arts.

Reference being had to the several parts of the drawings by the letters marked thereon, A represents a gas-purifier constructed in accordance with my invention, the same being provided at or near its top with an outlet B for the passage of the purified gas to a main or other source, and having an opening in its side at or near the bottom for receiving an upwardly-curved pipe or flue C, leading from the side of the pipe D, which conveys the gas from the furnace.

Supported interiorly of the purifier A, immediately above the mouth of the curved pipe C, is a hollow inverted-cup-shaped deflector E, that is held in place by brackets $a$, fastened to the sides of the apparatus A, as shown. This deflector is for the purpose of causing the incoming gas to be deflected downward, so as to pass through the body of water $b$, that is constantly contained in the reservoir or bottom of A up to the level indicated. The level of the water may always be regulated and controlled by means of the surface-cock c and the water-gage d, both in the side of the purifier A. For the purpose of keeping the deflector constantly cool, a pipe e is adopted, and is arranged, as shown, by which to discharge a stream of water immediately on top of the deflector. The reservoir may be emptied at any time through the discharge-cock f in the bottom of the reservoir at the side, and the foreign matter accumulating in the bottom of the reservoir may be cleaned out through the man-hole g, provided for that purpose.

Supported centrally of the purifier A are two or more circular water-shelves h h, the tops of which incline outwardly from the center to the periphery, as shown, the said shelves being arranged a suitable distance apart centrally within the apparatus A and being supported by the several brackets i. These centrally-arranged circular inclined shelves are made to alternate with several water-shelves j, arranged around the interior sides of the purifier A, and of a width sufficient to project inward slightly beyond the edges of the circular shelves, so that water discharged onto the upper side shelf will bound off onto the circular shelf beneath it, and so on, thus keeping up a series of breaks in the fall of the water down through the interior of the apparatus. The arrangement of the interior and side shelves with respect to each other is also such as to compel the gas to follow a zigzag course in its passage upward, and it will be observed that the fall of the water is almost at a right angle to the course of the gas, thus tending to a more complete attrition and breakage of the vesicles or globules of the gas and a consequent better purification. A further advantage obtained by inclining both the surrounding side shelves and the centrally-arranged shelves is that the water is caused to be projected into the path of the upwardly-flowing gas with greater certainty, and, besides, the flow of the water is better facilitated throughout the interior of the apparatus, thus inducing better results.

The water is sprayed down through the interior of the apparatus A from a circularly-arranged perforated pipe F, located above and having two supply-pipes s s, as shown.

From the foregoing description it is thought that the purpose and construction and arrangement of the several parts of my invention will be fully understood, and it will be understood that I could resort to immaterial changes therein and still be within the scope intended.

Having thus described my invention, what I claim as new, and desire to secure by Letters Patent, is—

1. In a gas washer or purifier, the combination, with the upright vessel A, having at or near its top an outlet for the washed or purified gas, and at or near its bottom with a curved inlet or supply pipe extending upwardly within said vessel, of an inverted cup-shaped deflector supported above the inner end of said pipe, and the pipe e, extending downwardly within the vessel and terminating slightly above the deflector, substantially as shown, and for the purpose described.

2. In a gas washer or purifier, the combination, with the upright vessel A, having gas inlet and outlet pipes and provided with the inverted-cup-shaped deflector, of the circular inclined water-shelves h h, arranged centrally within the vessel, the surrounding inclined side shelves j, alternating therewith, and the spray-pipes located above said shelves within the vessel A, substantially as shown and described.

In testimony whereof I affix my signature in presence of two witnesses.

CHARLES WADDY JARRELL.

Witnesses:
JOHN P. SPENCER,
JOSEPH L. PETERS.